(12) United States Patent
Steadman

(10) Patent No.: US 11,920,358 B2
(45) Date of Patent: Mar. 5, 2024

(54) BUMP STRIP

(71) Applicant: B/E Aerospace (UK) Limited, Leighton Buzzard (GB)

(72) Inventor: Samuel David Steadman, Coventry (GB)

(73) Assignee: B/E AEROSPACE (UK) LIMITED, Bedfordshire (GB)

( * ) Notice: Subject to any disclaimer, the term of this patent is extended or adjusted under 35 U.S.C. 154(b) by 0 days.

(21) Appl. No.: 17/708,114

(22) Filed: Mar. 30, 2022

(65) Prior Publication Data

US 2022/0325533 A1 Oct. 13, 2022

(30) Foreign Application Priority Data

Apr. 9, 2021 (EP) ..................................... 21275040

(51) Int. Cl.
*E04F 19/02* (2006.01)
(52) U.S. Cl.
CPC ................................. *E04F 19/026* (2013.01)
(58) Field of Classification Search
CPC ......... B64D 11/02; B64D 11/04; B64D 11/06; B64D 11/0696; E04F 19/026
See application file for complete search history.

(56) References Cited

U.S. PATENT DOCUMENTS

| 3,775,926 | A | * | 12/1973 | Brown | E04F 19/026 52/312 |
| 3,777,438 | A | * | 12/1973 | Brown | E04F 19/026 293/1 |
| 3,841,682 | A | * | 10/1974 | Church | B60R 19/445 52/716.5 |
| 3,861,110 | A | * | 1/1975 | Bartlett | E04F 19/026 293/1 |
| 3,991,537 | A | * | 11/1976 | Brown | E04F 19/026 52/312 |
| 4,066,285 | A | * | 1/1978 | Hall | B60R 13/04 52/716.6 |
| 4,083,592 | A | * | 4/1978 | Rubin | B60R 13/04 428/31 |
| 4,775,559 | A | * | 10/1988 | Kanamori | G09F 7/165 40/594 |
| 4,826,061 | A | * | 5/1989 | Heideman | B60R 9/10 224/326 |

(Continued)

FOREIGN PATENT DOCUMENTS

| EP | 3650345 A1 | 5/2020 | |
| WO | WO-9322528 A1 | * 11/1993 | ........... A47B 95/043 |
| WO | WO-2011149911 A1 | * 12/2011 | ............... B32B 7/02 |

OTHER PUBLICATIONS

Extended European Search Report for International Application No. 21275040.0 dated Sep. 21. 2021, 9 pages.

*Primary Examiner* — James M Ference
(74) *Attorney, Agent, or Firm* — CANTOR COLBURN LLP

(57) ABSTRACT

A bump strip includes first and second end caps and an intermediate part that, together, define a length of the bump strip. The end caps having an end part and a connecting part, and whereby one or more fastening holes is provided through the end cap connecting parts and the intermediate part such that a single fastener passing through the fastening hole of an end cap and the intermediate part secures the bump strip to a surface to be protected.

13 Claims, 6 Drawing Sheets

(56) References Cited

U.S. PATENT DOCUMENTS

| | | | | |
|---|---|---|---|---|
| 4,911,959 | A * | 3/1990 | Miyakawa | B60R 13/04 52/716.5 |
| 4,948,637 | A * | 8/1990 | Kessler | B60R 13/04 428/57 |
| 5,085,902 | A * | 2/1992 | Yada | B29C 48/16 156/244.11 |
| 5,096,753 | A * | 3/1992 | McCue | E04F 19/026 24/297 |
| 5,149,569 | A * | 9/1992 | McCue | A47B 95/043 24/297 |
| 5,288,048 | A * | 2/1994 | Shreiner | E04F 19/026 248/251 |
| 5,326,187 | A * | 7/1994 | St. Marie | E04F 11/1836 403/402 |
| 5,592,786 | A * | 1/1997 | Kamm | E04F 19/026 362/147 |
| 5,836,134 | A * | 11/1998 | Couto | A47B 95/043 52/717.03 |
| 6,385,939 | B1 * | 5/2002 | Stout | G09F 15/0025 52/287.1 |
| 6,479,747 | B2 * | 11/2002 | Bellanger | H02G 3/0608 174/50 |
| 6,748,716 | B1 * | 6/2004 | Peck, Jr. | E04F 19/026 52/287.1 |
| 7,380,381 | B2 * | 6/2008 | Honda | E04F 19/02 52/461 |
| 9,187,906 | B2 * | 11/2015 | Lyoda | E04F 11/1808 |
| 10,124,743 | B2 * | 11/2018 | Talebpour | B60R 13/0206 |
| 10,124,894 | B2 * | 11/2018 | Burd | B62B 3/003 |
| 2005/0005565 | A1 * | 1/2005 | McSharry | E04F 19/026 52/716.5 |
| 2005/0095413 | A1 * | 5/2005 | Wallace | F16F 3/093 264/260 |
| 2011/0284710 | A1 * | 11/2011 | Wallace | B32B 3/06 248/345.1 |
| 2014/0049974 | A1 * | 2/2014 | Daout | B64D 11/00 362/471 |
| 2016/0174709 | A1 * | 6/2016 | Ustach | E04F 19/026 248/345.1 |
| 2019/0376299 | A1 * | 12/2019 | Field | E04F 19/028 |
| 2022/0325533 | A1 * | 10/2022 | Steadman | B64D 11/02 |

* cited by examiner

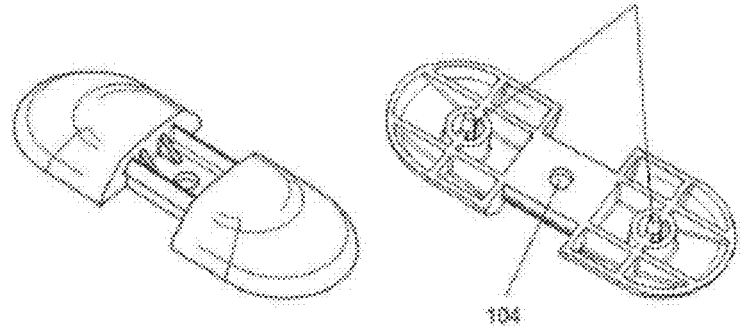
Fig. 2D
Fig. 2E
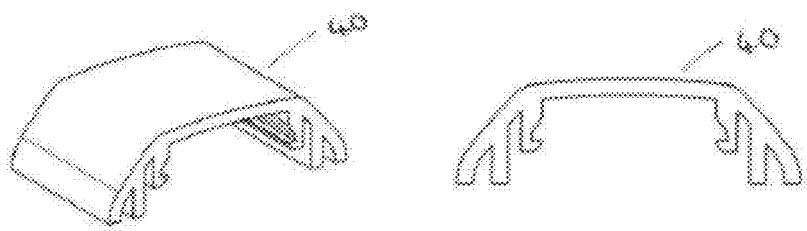
Fig. 2F
Fig. 2G

BUMP STRIP

CROSS-REFERENCE TO RELATED APPLICATIONS

This application claims priority to European Patent Application No. 21275040.0 filed Apr. 9, 2021, the entire contents of which is incorporated herein by reference.

TECHNICAL FIELD

The present disclosure relates to a bump strip, also known as a rub strip or bumper. Bump strips are provided on various structures or surfaces to protect them from damage from passing traffic. For example, bump strips are used in aircraft and are located at strategic positions on surfaces and monuments in the aircraft that may be at risk of damage due to passing traffic such as passengers, luggage, trolleys, drinks carts, etc. Bump strips are provided e.g. at doorways, entryways, closets, galley surfaces, lavatory surfaces, seats etc. and may also be provided on moveable items such as galley trolleys or carts. Such bumpers may, of course, find application in environments other than aircraft, e.g. in buildings, trains, buses, other forms of passenger transport, lifts, and anywhere where surfaces are to be protected from impact damage.

BACKGROUND

Bump strips, or bumpers or rub strips, are devices that can be attached to a surface to create a raised impact surface to protect the surface to which it is attached from damage due to passing traffic. Such strips are designed to be appropriately sized and positioned depending on the surface to be protected and the environment/likely area of impact. The strips are designed to be securely and reliably fixed to the surface such that they can withstand the expected impacts. Bump strips can be attached in various ways e.g. by adhesive or bolts. Preferably, the bump strips should be fixed to the surface in such a way that they can be removed and replaced if the bump strip itself becomes damaged. Bump strips should also be simple, relatively unobtrusive (especially where space is at a premium e.g. in aircraft) and easy and inexpensive to manufacture, while still being sufficiently robust and reliable.

A conventionally bump strip commonly used in aircraft (described in more detail below) comprises two end caps between which is provided a carrier part of an appropriate length for the surface to be protected. A hole is provided in the middle of the carrier part. The end caps and the carrier part are assembled to abut against each other and a spreader plate is positioned to extend over the carrier part and the end caps. The spreader plate is also provided with a fixation hole that is aligned with the hole in the carrier part. A bolt is passed through the fastening hole in the spreader plate and the hole in the carrier and is fastened to the surface to be protected. As the bolt is tightened, it secures the spreader plate tightly against the carrier part and the end plates to clamp them tightly together to form a single bumper strip unit. In other assemblies, the end caps are secured to the surface by bolts and an intermediate carrier is provided between the end caps and held in place by a spreader plate clamped across the end caps and the intermediate carrier. A cover is removably fitted over the assembly to cover the bolt(s).

Whilst such conventional assemblies are simple to manufacture and use, they have been found to have some points of failure whereby the bump strip can become detached from the surface in service. Because either the end plates or the carrier of the assembly are only secured by the clamping effect of the bolted spreader plate and are not themselves bolted or otherwise fixed to the surface, if the fixing loosens, relative movement between the various components and also between the components and the surface, is possible. The end caps or the carrier may be free to move and can break off.

There is a need for a more reliable bump strip assembly that is still simple and inexpensive to manufacture.

SUMMARY

According to the disclosure, there is provided a bump strip comprising first and second end caps and an intermediate part defining, together, a length of the bump strip, the end caps having an end part and a connecting part, and whereby one or more fastening holes is provided through the end cap connecting parts and the intermediate part such that a single fastener passing through the fastening hole of an end cap and the intermediate part secures the bump strip to a surface to be protected.

In contrast to the conventional design, all parts of the strip are directly secured to the surface to be protected by the fastener rather than only one part being secured by a fastener and the other(s) being held by a clamping force of the other parts.

In one example, the first and second end caps and the intermediate part are formed as a single piece part such that the connecting parts define the intermediate part such that the one or more fastening holes through the connecting parts and the intermediate part are the same one or more fastening holes.

In another example, each end cap has a connecting part provided with one or more fastening holes and wherein the intermediate part is defined by a carrier part, the carrier part also provided with one or more fastening holes, and wherein the connecting parts and carrier part are arranged to overlap each other such that at least one of the one or more fastening holes in each of the connecting parts and the carrier part overlap such that a fastener can pass through the overlapped hole(s) to secure the bump strip to the surface to be protected.

In another example, each end cap has a connecting part defining a recess such that when the connecting parts of the two end caps are positioned side-by-side the recesses define a fastening hole, and wherein the intermediate part is defined by a carrier part, the carrier part also provided with one or more fastening holes, and wherein the side-by-side connecting parts and carrier part are arranged to overlap each other such that the fastening hole defined by the connecting parts and a fastening hole in the carrier part overlap such that a fastener can pass through the overlapped hole(s) to secure the bump strip to the surface to be protected.

In another example, each end cap has a connecting part provided with one or more fastening holes and wherein the intermediate part is defined by a carrier part, the carrier part also provided with one or more fastening holes at each of its ends, and wherein the connecting part of a first of the end caps and the carrier part are arranged such that a fastening hole in the connecting part of the first end cap overlaps a fastening hole at a first end of the carrier part and the connecting part of a second of the end caps and the carrier part are arranged such that a fastening hole in the connecting part of the second end cap overlaps a fastening hole in a second end of the carrier part such that a fastener can pass through the overlapped hole(s) to secure the bump strip to the surface to be protected. The carrier part may be provided with a strengthening rib between its ends. The fastening hole(s) may be an elongate slot.

The bump strip may also include a cover arranged to fit over the strip between the end caps.

Protrusions may be located on an underside of the strip to prevent rotation of the end caps.

BRIEF DESCRIPTION OF THE DRAWINGS

Preferred embodiments will now be described by way of example only with reference to the drawings in which:

FIGS. 2D and 2E show a top and bottom view of a bump strip according to the first example;

FIGS. 2F and 2G show a perspective and side view of a cover for the bump strip of the first example;

FIG. 5A is an exploded view of a bump strip of this disclosure, according to a fourth example; and FIG. 5B is a side sectional view of a bump strip as shown in FIG. 5A.

DETAILED DESCRIPTION

Figure 1A:
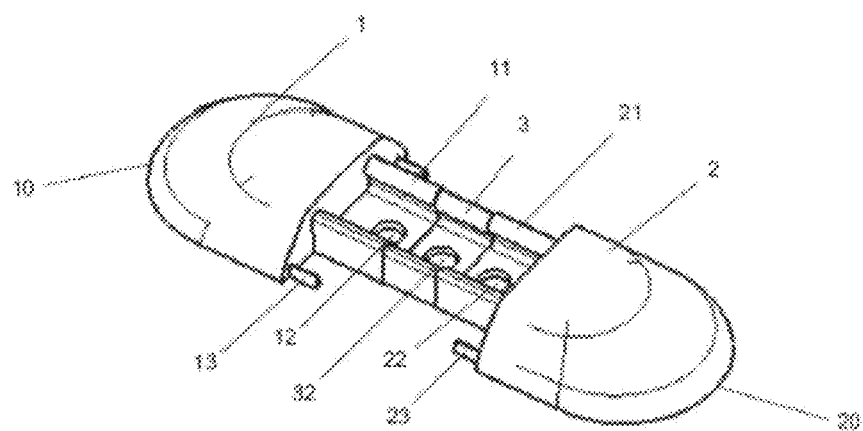
FIG. 1A is a perspective partial view of a conventional bump strip.

By way of background and to aid explanation, a conventional bump strip will first be described with reference to FIGS. 1A to 1C.

The bump strip comprises two end caps 1, 2 and a carrier part 3. The end caps 1, 2 can be standard for all lengths of bump strip and the length of the carrier part 3 is selected such then when the end caps and the carrier part are assembled in abutting alignment, as shown in FIG. 1A, the overall assembly has the required bump strip length.

The end caps 1, 2 may be formed in various shapes and sizes. In the example shown, the end caps are formed with a raised and rounded end part 10, 20 which define the ends of the strip, and a connecting part 11, 21 extending away from the rounded end. The connecting part 11, 21 may be provided with a fixing hole 12, 22 for use in examples where the fixing to the surface is provided by passing a bolt through the end caps, e.g. for longer bump strips. For shorter examples, where the assembly is attached to the surface by a bolt through the carrier part, the holes in the end caps will not be used and so end caps without such holes could also be used.

Locating pins 13, 23 may also be provided, extending inwards from the end parts, for attachment of the cover 4, described further below.

The carrier part 3 is preferably shaped so that it can be aligned with an abutted against the connecting parts 11, 21 of the end caps 10,20. The carrier part 3 is provided with a fixing hole 32. Again, if the assembly is to be used in an example where the fixing is through holes in the end caps and the carrier part is secured by clamping thereto, then this hole 32 may not be required. The carrier part and the connecting parts may also be formed with a lip 111, 222, 333 for securement of the cover, as described below.

Figure 1B:
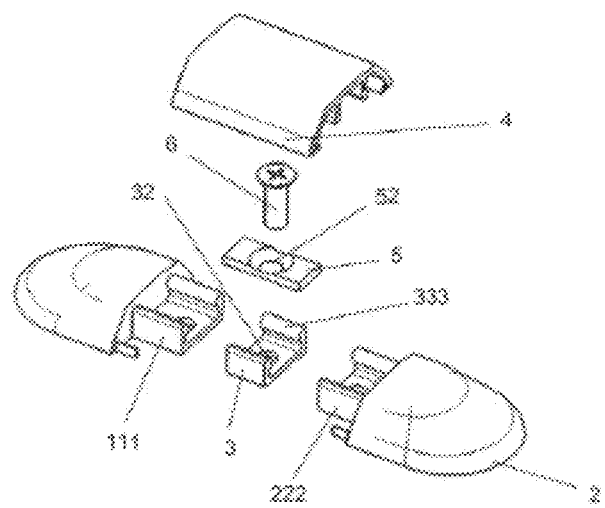
FIG. 1B is an exploded view of a bump strip as shown in FIG. 1A.
Figure 1C:
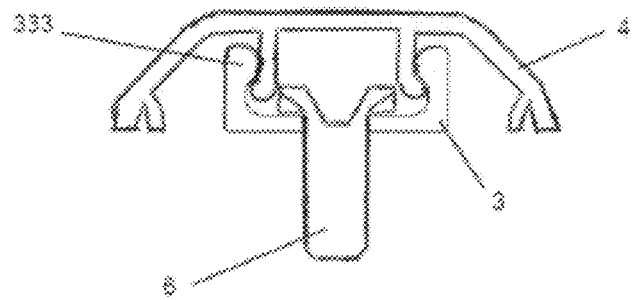
FIG. 1C is a side sectional view of the bump strip of FIGS. 1A and 1B.
Figure 2A:
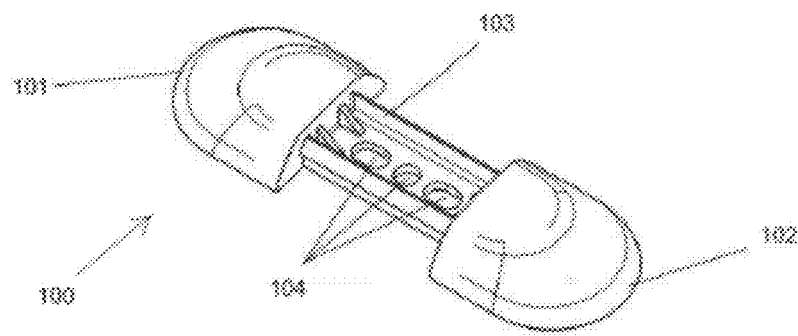
FIG. 2A is a perspective partial view of a bump strip of this disclosure, according to a first example.
Figure 2B:
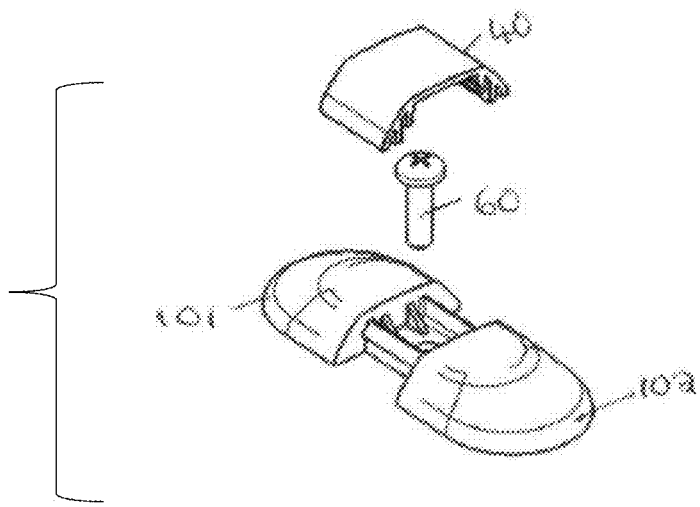
FIG. 2B is an exploded view of a bump strip as shown in FIG. 2A.
Figure 2C:
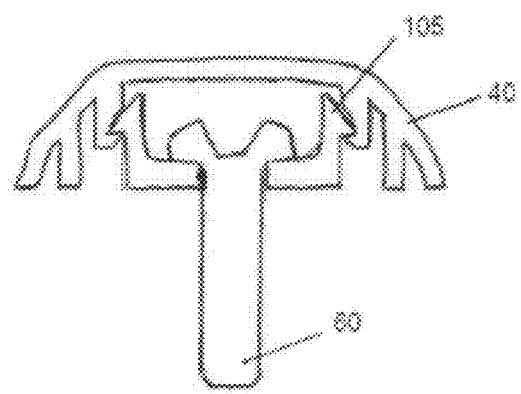
FIG. 2C is a side sectional view of the bump strip of FIGS. 2A and 2B.

In use, the end caps are abutted against either side of the carrier part 3 as shown in FIG. 1A. A spreader plate 5 is then fitted over the carrier part 3. The spreader plate 5 has a hole 52 therethrough which is aligned with the hole in the carrier part 3. The spreader plate 5 is dimensioned to be longer than the carrier part such that when located across the carrier part, the spreader plate 5 also extends over the connecting parts 11, 21 of the end caps 10, 20. A bolt 6 is then tightly fastened through the hole 52 in the spreader plate 5 and the hole 32 in the carrier part 3 and into the surface to which the strip is to be attached. As the bolt 6 is tightened it presses the spreader plate 5 to clamp against the carrier part 3 and also the end parts 11, 21 of the end caps 10, 20 thus holding all of the parts together and attached to the surface. A cover 4 is then fitted over the assembly to cover the connecting parts, carrier part, spreader plate and bolt. The cover is ideally designed to have an outer profile matching that of the end parts of the end caps to form a uniform outer profile across the length of the assembled strip. The inner profile of the cover 4 may be formed so as to clip onto the locating pins 13, 23 and/or the lips 111, 222, 333 of the end caps and the carrier part as best seen in FIG. 1C. Various profiles and securement details can be used for the cover to be attached to the strip assembly. Ideally, the cover should be securely but removable attached to the strip assembly. If the strip is to be removed from the surface, the cover can be unclipped to reveal the bolt which can then be unfastened thus releasing the assembly parts.

As mentioned above, because, in conventional bump strip assemblies either the end caps or the carrier part is only held in place by the clamping effect of the spreader plate, relative movement might occur between the component parts and the fastening may loosen. This can result in the end caps and/or the carrier strip rotating or breaking away from the assembly.

The designs of this disclosure address this problem by ensuring that none of the parts are only secured by a clamping force from another component, whilst retaining the same overall profile of the resulting bump strip.

In a first example, shown in FIGS. 2A to 2D, the strip assembly is formed as a single piece part 100 having opposing rounded ends 101, 102 connected by a bridging portion 103. The length of the bridging portion 103 is selected according to the application and the bridging portion is provided with one or more fastening holes 104. The profile of the ends 101, 102 is preferably similar to that of the end parts of the conventional design described above. The profile of the bridging part 103 is preferably similar to that of the combined connecting parts and carrier part of the conventional design and, as with the conventional design, may be provided with a lip 105 for attachment of a cover 40. The one piece part can then be fixed to the surface to be protected by securing a bolt 60 through the fastening hole 104 without the need for an intermediate, clamping, spreader plate. The bridging part and bolt are then covered by a cover 40 which may be of a similar design to the conventional cover described above. The length of the cover is also selected according to the application.

To provide additional fixation and to further secure the strip against rotation relative to the surface, pegs 50 may be provided on the underside of the strip as best seen in FIGS. 2D and 2E.

Figure 3A:
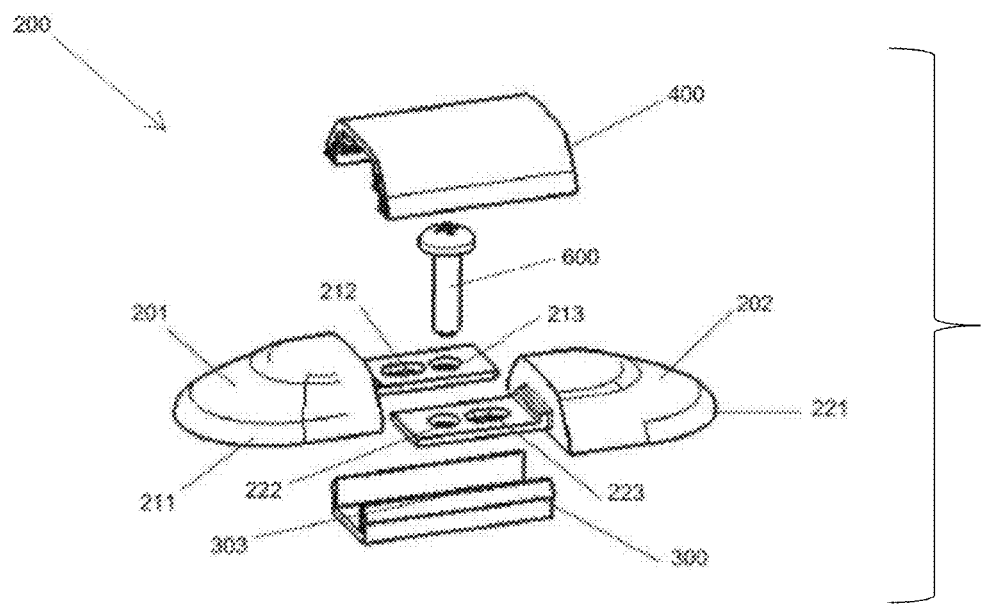
FIG. 3A is an exploded view of a bump strip of this disclosure, according to a second example.
Figure 3B:
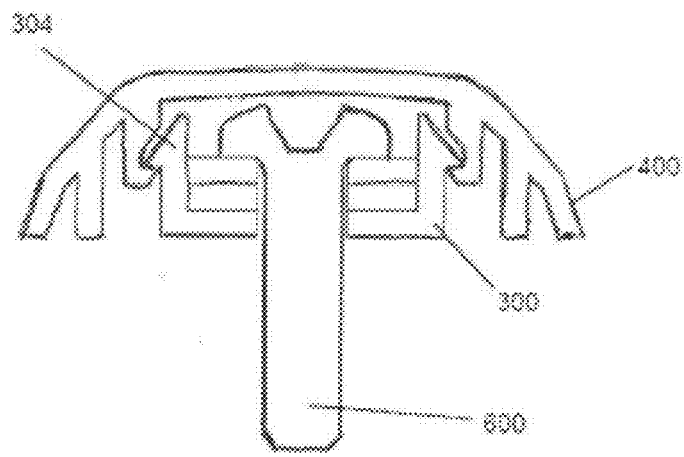
FIG. 3B is a side sectional view of a bump strip as shown in FIG. 3A.

In an alternative design according to this disclosure as shown in FIGS. 3A and 3B, the bump strip 200 comprises two end caps 201, 202 having end parts 211, 221 and connecting parts 212, 222 and a carrier part 300. In this design, in contrast to the conventional design where the connecting parts and the carrier part abut against each other in the longitudinal direction of the strip, the connecting parts 212, 222 and the carrier part 300 stack one on top of the other—i.e. overlap as seen in FIG. 3A. The length of the connecting parts and the carrier part is selected according to the desired length of bumper strip and the parts are provided with one or more fastening holes 213, 223, 303. The end caps and the carrier part are assembled so that the connecting parts and the carrier part overlap and the holes in the parts are aligned. A bolt 600 is then fastened through the parts via the aligned holes to the surface to be protected. The carrier part may be provided with a lip 304 for clip attachment of a cover 400 in a manner similar to that described for other examples. In this example, each connecting part and the carrier and the cover will have substantially the same length. As with the first example, all parts defining the length of the bump strip—i.e. the end caps and the carrier part, are secured by the bolt rather than relying on the clamping effect of another component.

Figure 4A:
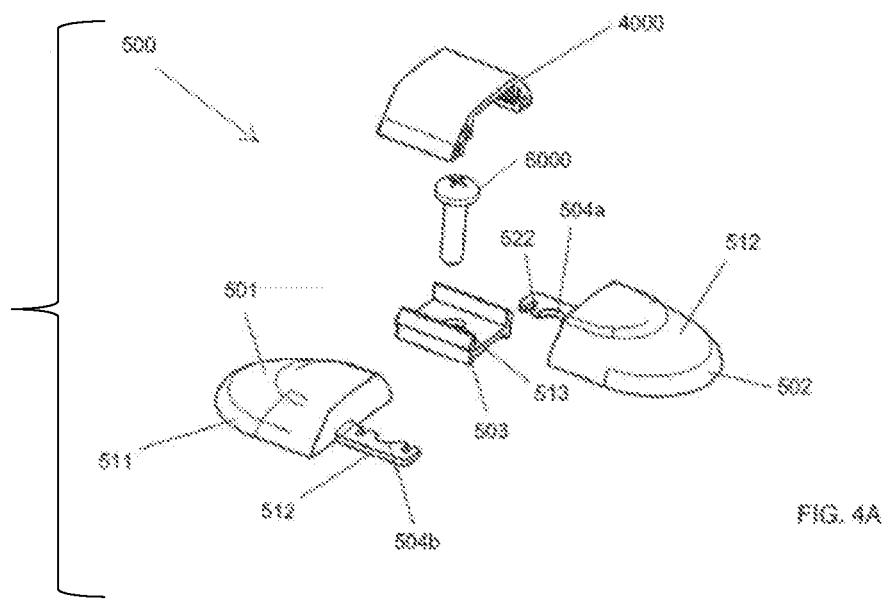
FIG. 4A is an exploded view of a bump strip of this disclosure, according to a third example.
Figure 4B:
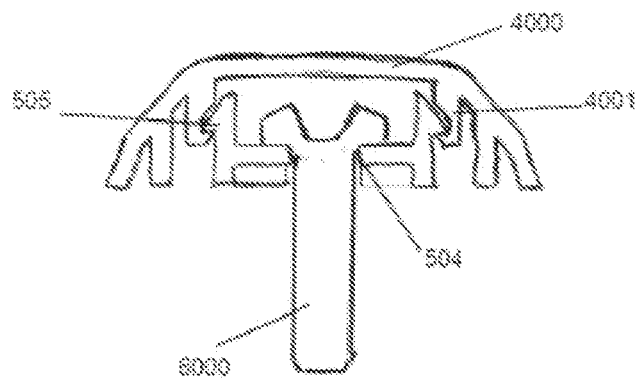
FIG. 4B is a side sectional view of a bump strip as shown in FIG. 4A\.
Figures 4C, 4D:
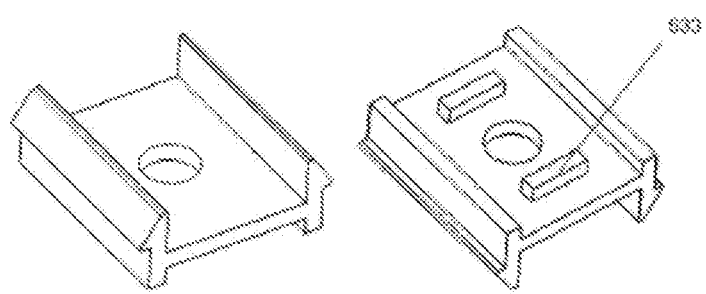
FIGS. 4C and 4D show the underside of a carrier part for use with the third example.
Figure 6A:
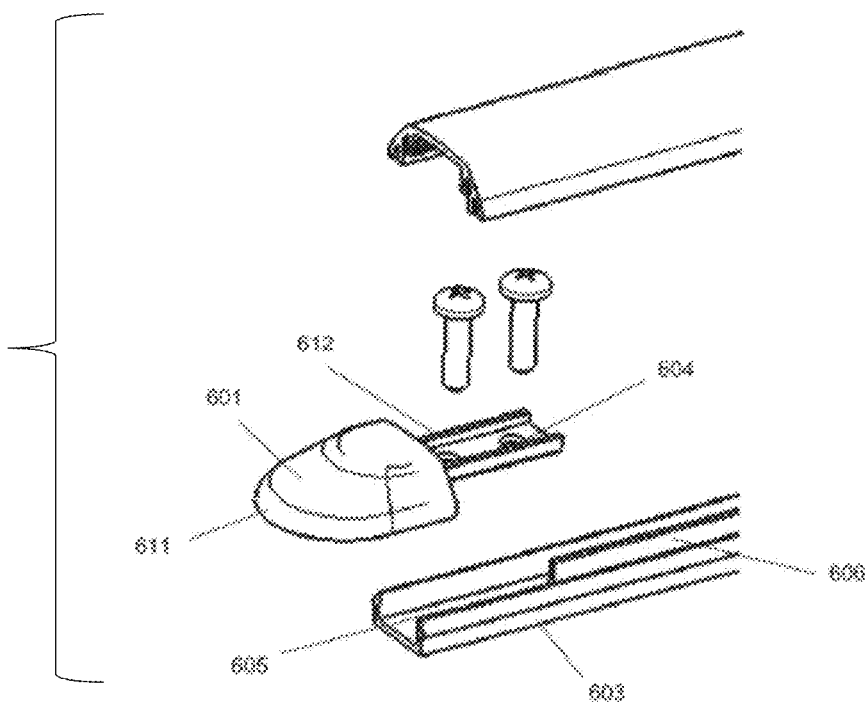
Figure 6B:
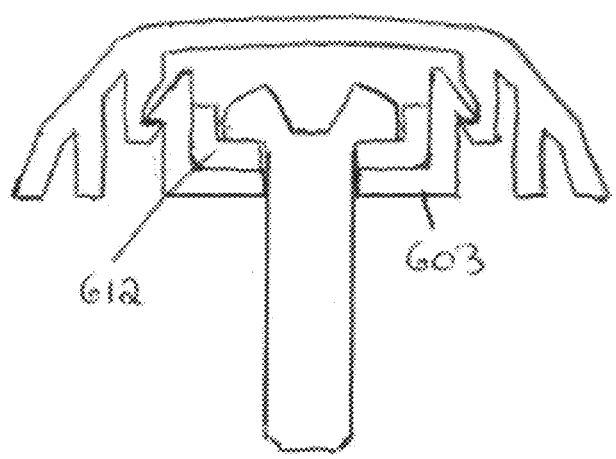

A further alternative design is shown in FIGS. 4A and 4B. Again, the bump strip 500 comprises two end caps 501, 502 and a carrier part 503. As with other designs described above, the end caps have an end part 511, 521 and a connecting part 512, 522. In this example, the connecting parts are shaped with a recess (504a, 504b) such that when assembled side-by-side they define a fastening hole 504. The carrier part 503 is also provided with a fastening hole 513. In this example, the end caps are positioned such that the connecting parts fit together in side-by-side arrangement to define the fastening hole 513 and the carrier part 503 is then positioned over the connected parts. The carrier part 503 is preferably provided with locking features 533 on its underside to engage with the connecting parts of the end caps to prevent them moving away from each other, and to retain the integrity of the fastening hole 504. The fastening hole 513 in the carrier part is aligned with the hole 504 formed by the cooperating shapes of the connecting parts of the two end caps and the assembly is fastened by a bolt 6000 and covered by a cover 4000 as in the other examples. The cover may be clipped to the strip by an inner profile feature 4001 engaging with a lip 505 of the carrier part 503 as before. The length of the connecting parts and the carrier part and the cover are selected according to the desired strip length.

In another example, as shown in FIGS. 5A and 5B, which is particularly useful for longer bumper strips, the bumper strip comprises two end caps (only one of which is shown here) 601 and a carrier part 603 of a length selected according to the desired length of the strip. As with previous designs, the end caps have an end part 611 and a connecting part 612, the connecting part provided with one or more fastening holes 604. The carrier part 603 is provided with a fastening hole which may, as in the example shown, be in the form of a slot 605. The length of the strip may be adjustable is the connecting part is provided with several fastening holes as shown in FIG. 5A and a slot 603. To assemble, the end cap is arranged such that the connecting part 612 fits over the carrier part 603 such that the fastening holes 604, 605 are aligned so that a bolt can be passed through both parts to secure the strip to the surface to be protected. A cover of a suitable length is attached over the strip as described for previous examples. For longer strip lengths, where the carrier part 603 is relatively long, a rib 606 may be provided along the length of the part to provide extra support and rigidity.

The components of all embodiments may have various inner and outer profiles provided they engage and perform the functions described above. The disclosure is not limited to any particular shapes or sizes or number of fastening holes or number of pegs or other features that may be provided in various embodiments.

The bump strip components can be manufactured according to known processes. Injection moulding is a manufacturing process that allows components having a good finish to be manufactured at low cost. As bump strips will generally be located where they will be visible, the finish should be good. Other manufacturing processes e.g. extrusion, additive manufacture etc. can, of course, be used.

The bump strips of this disclosure should ideally be suitable for applications where conventional bump strips are already used and so the overall profile and fixing structures, as well as the tools required for installation, should be essentially the same as the existing designs. In this way, the new design can be retrofitted to existing structures as well as being used in new structures.

The bump strip of this disclosure is a simple, inexpensive and reliable solution to the problems of existing designs.

The invention claimed is:

1. A bump strip comprising:
a first end cap;
a second end cap; and
an intermediate part between the first and second end caps, the intermediate part and the first and second end caps defining, together, a length of the bump strip;
wherein the first and second end caps each have an end part and a connecting part, and whereby one or more fastening holes is provided through the end cap connecting parts and the intermediate part such that a single fastener passing through a fastening hole of the one or more fastening holes of an end cap of the first and second end caps and the intermediate part secures the bump strip to a surface to be protected;
wherein the connecting part of each of the first end cap and the second end cap defines a recess such that when the connecting parts of the two end caps are positioned side-by-side the recesses define a fastening hole;
wherein the intermediate part is defined by a carrier part, the carrier part also provided with one or more fastening holes; and
wherein the side-by-side connecting parts and carrier part are arranged to overlap each other such that the fastening hole defined by the connecting parts and a fastening hole in the carrier part overlap such that a fastener can pass through the overlapped holes to secure the bump strip to the surface to be protected.

2. The bump strip of claim 1, wherein the first and second end caps and the intermediate part are formed as a single piece part such that the connecting parts define the intermediate part such that the one or more fastening holes through the connecting parts and the intermediate part are a same one or more fastening holes.

3. The bump strip of claim 2, wherein the bump strip has a single fastening hole which comprises the fastening hole through the connecting parts and the intermediate part.

4. The bump strip of claim 1, wherein the intermediate part is defined by a carrier part, the carrier part also provided with one or more fastening holes, and
wherein the connecting parts and carrier part are arranged to overlap each other such that at least one of the one or more fastening holes in each of the connecting parts and the carrier part overlap such that a fastener can pass through overlapped holes to secure the bump strip to the surface to be protected.

5. The bump strip of claim 1, wherein the carrier part is provided with locking features to secure the connecting parts in side-by-side arrangement.

6. The bump strip of claim 1, wherein:
each of the first and second end caps has a connecting part provided with one or more fastening holes and wherein the intermediate part is defined by a carrier part having two ends;
the carrier part also provided with one or more fastening holes at each of the two ends of the carrier part, and wherein the connecting part of the first end cap and the carrier part are arranged such that a fastening hole in the connecting part of the first end cap overlaps a fastening hole at a first end of the carrier part; and
the connecting part of the second end cap and the carrier part are arranged such that a fastening hole in the connecting part of the second end cap overlaps a fastening hole in a second end of the carrier part such that a fastener can pass through the overlapped holes to secure the bump strip to the surface to be protected.

7. The bump strip of claim 6, wherein the carrier part is provided with a strengthening rib between the two ends of the carrier part.

8. The bump strip of claim 6, wherein the one or more fastening holes in the carrier part comprises an elongate slot.

9. The bump strip of claim 1, further comprising:
a cover arranged to fit between the first end cap and the second end cap.

10. The bump strip of claim 9, wherein the cover is provided with catch means to engage with latching means provided on the end caps and/or intermediate part.

11. The bump strip of claim 1, wherein the end caps are provided with a rounded end part defining an end of the bump strip.

12. The bump strip of claim 1, further comprising:
a bolt to secure the bump strip to the surface to be protected by passing through the one or more fastening holes.

13. The bump strip of claim 1, further comprising:
one or more protrusions located on an underside of the bump strip to prevent rotation of the end caps.

* * * * *